Feb. 18, 1964　　　G. T. RANDOL　　　3,121,468
HYDRAULIC-POWER STEERING MECHANISM
Filed July 25, 1961　　　3 Sheets-Sheet 1
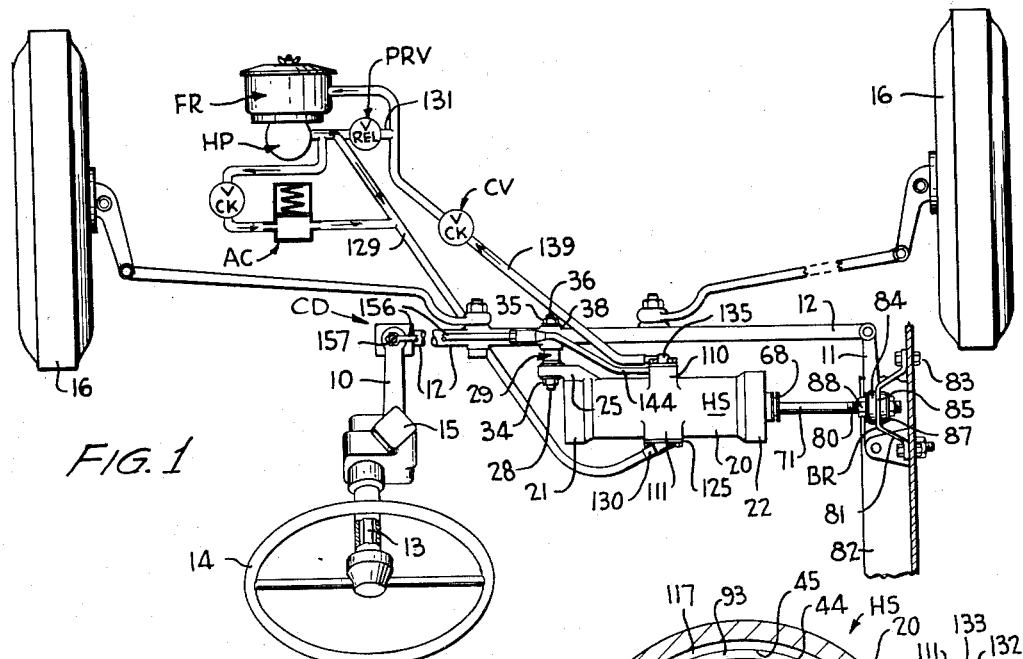
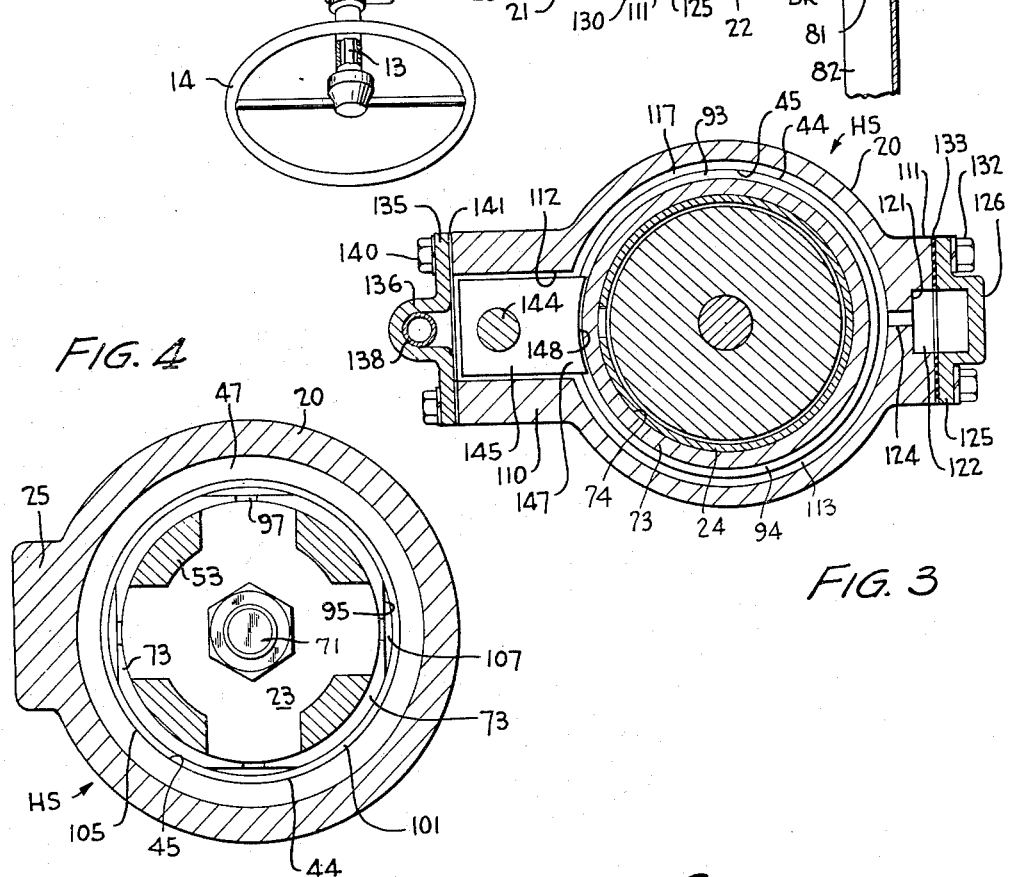
Inventor

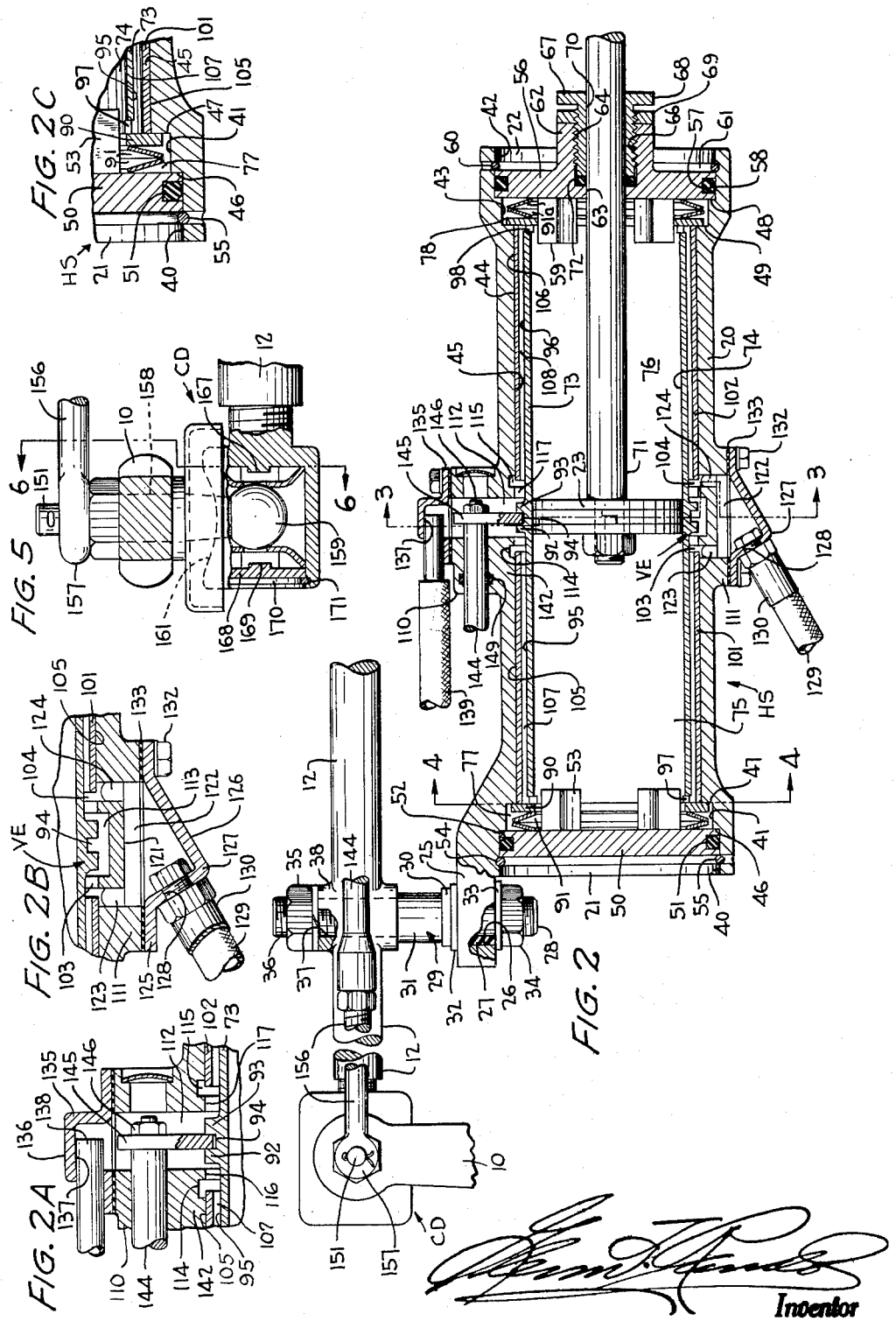

Feb. 18, 1964 G. T. RANDOL 3,121,468
HYDRAULIC-POWER STEERING MECHANISM
Filed July 25, 1961 3 Sheets-Sheet 3
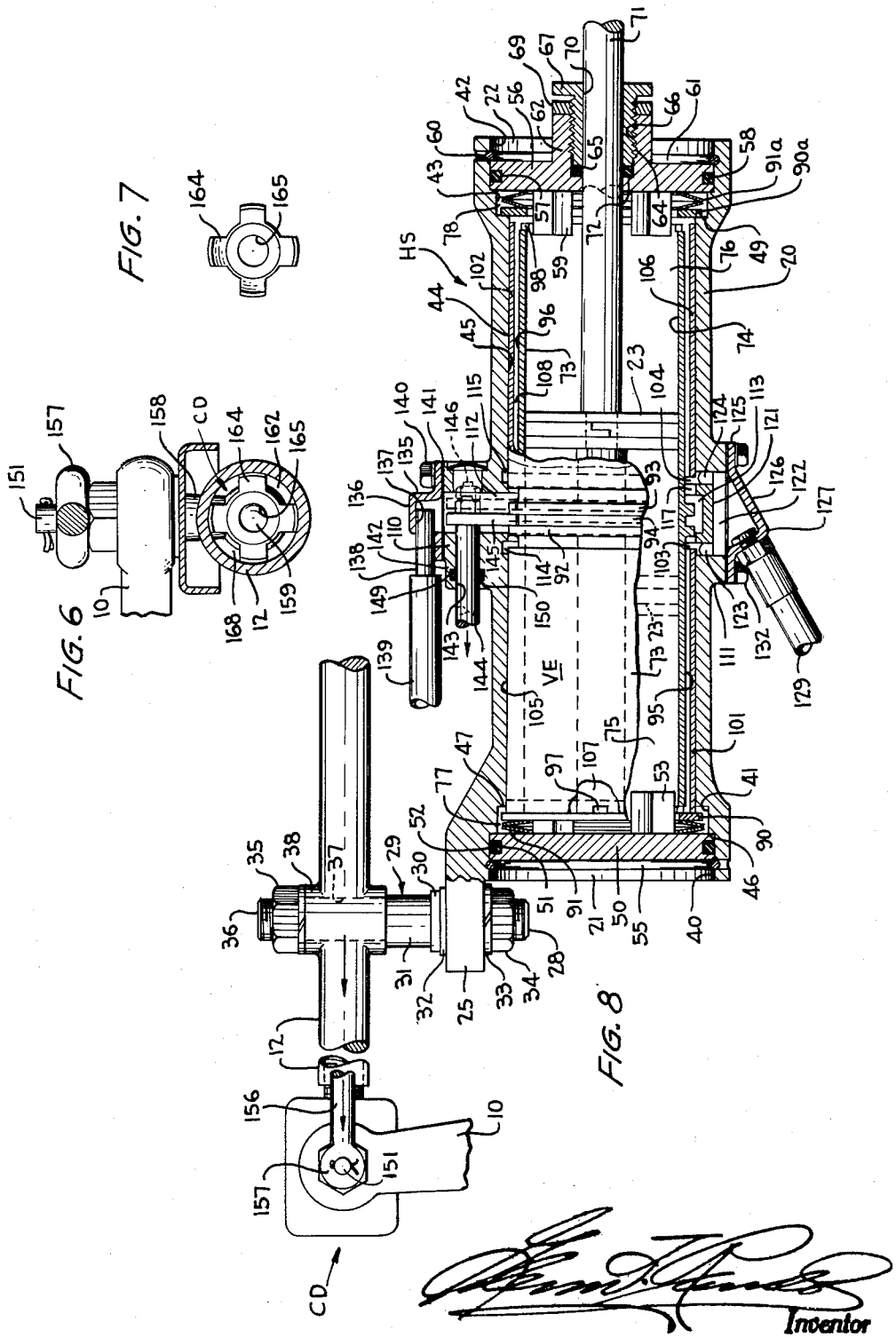
Inventor

United States Patent Office 3,121,468
Patented Feb. 18, 1964

3,121,468
HYDRAULIC-POWER STEERING MECHANISM
Glenn T. Randol, 2nd Ave. and Pauli St., Box 275,
Mountain Lake Park, Md.
Filed July 25, 1961, Ser. No. 127,456
16 Claims. (Cl. 180—79.2)

This invention relates to power steering systems for automotive vehicles and the like, and more particularly to a hydraulically-operated system in which the steering booster servomotor and control valve therefor form a self-contained unit wherein the control valve is substantially coextensive with and axially slidable within the cylinder of said servomotor for compactness, and simplification of the associated fluid conduit system.

The primary object of the invention is to provide a unitary hydraulic steering booster servo and control valve mechanism therefor which are movable relatively and as a unit, and wherein the valve mechanism is subject to proportionally reduced hydraulic reaction from the booster servo to provide the operator with physical awareness of the hydraulic force required to overcome variable resistance to steering of the dirigible wheels of the associated motor vehicle, and thereby provide reaction control devoid of resiliency.

An object related to the object next above is to provide an improved hydraulic steering-servo for motor vehicles in which the connected steering linkage system comprises a steering bar, commonly referred to as a drag link, terminating at one end in a cylindrical casing in which is disposed, between two resilient stops, the ball end of the pitman or steering arm mounted on a pivotal shaft that is subject to the action of the steering shaft which in turn is connected to the steering wheel, the resilient characteristic of said stops being calculated so that a predetermined turning force imparted to the steering wheel can selectively compress one or the other of said stops depending on the direction of turning until direct engagement thereof with said drag link is effected for direct actuation of the steering should hydraulic-power fail, thereby increasing the service life of the valve mechanism since such manually-applied forces are not transmitted through the latter mechanism, nor are the forces from the resilient stop means.

Another object is to utilize in a novel manner a single link to interconnect the ball end of the pitman arm with a movable element of the valve mechanism whereby relative operating movement of the pitman arm with respect to said drag link, accommodated by said stops, imparts a like movement to said valve element which in turn distributes hydraulic fluid under pressure to said servomotor for imparting movement to the steering drag link in one direction or the other, according to the hydraulic distribution circuit activated by said valve element.

Another object related to the object immediately above is the provision of novel spring centering means for the said valve element and servo-cylinder to bias them toward their respective normal neutral positions corresponding to halted position of the steering wheel during straight-ahead driving, or when slowly negotiating a turn wherein extremely low road resistance is encountered, said spring means cooperating with the hydraulic reaction aforesaid on said valve element to enable the driver to sense the turning effort required to produce the required hydraulic assist.

Another feature of my invention is the provision of a novel hydraulically-operated steering gear which operates to provide steering assist only when turning the vehicle, and wherein pressure within the system is very low, that is, non-activating when the valve mechanism is in neutral position due to the passageways being open for substantially unrestricted circulation of the fluid. Thus, when the valve mechanism is in neutral position, very little power is required to operate the pump, and the non-activating fluid being circulated through the valve mechanism and steering servo is of such intensity that a "cushioning" effect is produced within the servo to absorb road shocks transmitted to the driver through the steering linkage for stabilizing the steered direction of the ground wheels selected by the driver.

In the illustrative embodiment of the present invention, said valve mechanism comprises a novel sleeve-type element slidably engaging the interior surface of the movable servomotor cylinder in fluid-tight sealed relationship therewith, and wherein the hydraulic piston is stationary and mounted in said valve element to define therewith, two oppositely disposed working chambers, one on each side of said piston.

In the interest of brevity, other objectives and salient features will be noted hereinafter in lieu of presenting them categorically in the above general statement of the nature of my invention. A more comprehensive understanding of the advantages of my invention and its mode of operation may be derived from the detailed description thereof to follow with reference to the accompanying drawings in which:

FIGURE 1 is a schematic depiction of a conventional steering system for automotive vehicles and the like incorporating hydraulic-power steering mechanism constructed in accordance with the present invention;

FIGURE 2 is a longitudinal vertical section on an enlarged scale of the steering servomotor per se illustrated in FIGURE 1 with associated portions of the steering linkage;

FIGURE 2A is a fragmentary portion of FIGURE 2 on an enlarged scale to clarify details of the outlet side of the control valve mechanism;

FIGURE 2B is another fragmentary portion of FIGURE 2 on an enlarged scale to clarify details of the inlet side of the control valve mechanism;

FIGURE 2C is another fragmentary portion of FIGURE 2 on an enlarged scale to clarify details of the hydraulic and spring reaction associated with opposite ends of the control valve sleeve;

FIGURE 3 is a transverse section taken along the line 3—3 of FIGURE 2 showing details of the control valve mechanism and associated parts of the servomotor;

FIGURE 4 is another transverse section taken on an enlarged scale along the line 4—4 of FIGURE 2 showing additional details of the servomotor and valve construction therefor;

FIGURE 5 is a longitudinal vertical section showing details of the spring-loaded centralizing mechanism which interconnects the steering arm with a part of the steered parts of the vehicle;

FIGURE 6 is a transverse section taken along the line 6—6 of FIGURE 5 showing additional details of the centralizing mechanism;

FIGURE 7 illustrates one of the pair of star-shaped springs per se employed in the centralizing mechanism; and FIGURE 8 is a view of the steering-servo per se as shown in FIGURE 2 but with the parts in operating positions corresponding to a right turn assist of the vehicle.

Referring now to the drawing wherein like reference characters refer to like and corresponding parts throughout the several views, the illustrative embodiment of my invention is disclosed in FIGURE 1 in operative association with a swingable steering pitman arm 10, idler arm 11 and interconnecting drag link 12, steering shaft 13 and steering wheel 14, and a worm and sector connection indicated by its housing 15 between the steering shaft and pitman arm to swing the latter to impart corresponding reciprocable movements to said drag link, and thus change the path of rotation of the vehicle dirigible wheels 16 to steer the vehicle in response to manual force applied to the steering wheel as is understood.

*Unitary Servomotor and Control Valve Therefor*

The hydraulic steering servomotor generally designated "HS" comprises a double-stroke cylinder 20 formed with open ends 21, 22, within which stationary piston 23 is mounted in operative relationship to said cylinder and sealed by a packing disclosed herein as a lapped end piston ring 24. The exterior of the cylinder is provided with an integral mounting bracket 25 which is offset from the axis of said cylinder and projects beyond the end 21 thereof. This bracket is provided with a hole 26 having an annular rubber-like bushing 27 through which a reduced diameter threaded end portion 28 of a pivot pin 29 projects. A shoulder 30 is provided between the portion 28 and the normal diameter portion 31 of the pin 29, against which a thrust-washer 32 bears on one side of the bushing, and the opposite side of the latter is engaged by a similar thrust-washer 33 whereby a securing nut 34 threaded into the portion 28 pivotally connects the cylinder 20 to swing about the pivot pin 29 with the bushing aforesaid under slight compression, the opposite end of the pin 29 being attached to the steering drag link 12 by a nut 35 on a reduced diameter threaded portion 36 projecting through a hole 37 in an embossment 38 integral with said drag link thereby mounting the cylinder 20 to have a universal movement relative to the rectilinear path of movement described by the drag link. The end 21 of the cylinder 20 is provided with two counterbores 40, 41, and the opposite end 22 of the cylinder is similarly provided with two counterbores 42, 43, said counter bores 41 and 43 defining opposite ends of a longitudinal bore 44 which is substantially coextensive with said cylinder, said bore being provided with a smooth finished cylindrical interior surface 45. Counterbores 40, 41 define internal annular shoulders 46, 47 respectively with the shoulder 47 terminating one end of said bore 44, while counterbores 42, 43 define similar internal annular shoulders at 48, 49 with the shoulder 49 terminating the other end of said longitudinal bore 44. The open end 21 of the cylinder is closed by a circular wall 50 disposed in the counterbore 40 in engagement with the shoulder 46, said closure wall being provided with an annular groove 51 in its periphery which receives an annular O-ring packing 52 to effect a fluid-tight seal with the counterbore 40, and projecting from the inner side of the closure wall, is a plurality of arcuately formed abutments 53 disposed in spaced relation along an imaginary circle as shown in FIGURE 4. An internal annular groove 54 is provided in the counterbore 40 adjacent the outer end thereof for reception of a split-type retaining ring 55 to lock the closure wall against the shoulder 46. Similarly, the opposite open end 22 of the cylinder is closed by a circular wall 56 disposed in the counterbore 42 in engagement with the shoulder 48, said last-named closure wall being provided with an annular groove 57 in its periphery which receives an annular O-ring packing 58 to effect a fluid-tight seal with the counterbore 42, and projecting from the inner side of this latter wall, is a plurality of arcuately formed abutments 59 disposed in spaced relation along an imaginary circle as shown. An internal annular groove 60 is provided in the counterbore 42 adjacent the outer end thereof for reception of a split-type retaining ring 61 to lock the wall 56 against the shoulder 49. A bearing extension 62 projects coaxially from the outer side of the closure wall 56, said extension having an inner axial bore 63 merging with an outer counterbore 64 to form an internal annular shoulder 65 therebetween, said counterbore being internally threaded at 66 for engagement by an externally threaded bushing 67 terminating at its outer end as an enlarged hexagonal nut 68, and a lock nut 69 is provided on the threaded portion 66 as shown to lock the bushing 67 in its axially adjusted position. A bore 70 is provided through the bushing 67 in coaxial disposition with respect to the bore 63.

The piston 23 is provided with a piston-rod 71 which passes through the coaxial bores 63, 70 to the exterior of the cylinder. Sealing of the piston rod is effected by an O-ring packing 72 disposed between the shoulder 65 and confronting end of the threaded portion of the bushing 67 whereby slight compression is given the packing to insure a fluid-tight seal of the piston-rod.

Slidably disposed in the bore 44 in intimate fluid-sealing contact therewith is a novel sleeve-type valve element generally designated "VE," said element comprising a cylindrical sleeve 73 having a smoothly finished internal surface 74 intimately engaging the periphery of the piston 23 whereby the element operates relatively to the cylinder 20 and to the piston 23 in controlling operation of the servomotor HS.

The piston divides the interior of the valve element VE into opposing fluid pressure working chambers 75, 76, said chambers having continuous communication with reaction chambers 77, 78 respectively defined by the shoulders 47, 49 and their respective confronting marginal face portions on the closure walls 50, 56 at opposite ends of the cylinder.

The outer end of the piston-rod 71 has a threaded portion 80, and is pivotally connected to and adapted to have a swinging motion with respect to a mounting bracket "BR" therefor of U-shaped configuration rigidly secured by its legs 81 to the vehicle frame 82 as by bolts 83. A resilient connection is preferably associated with the bracket and piston-rod and which comprises an annular rubber-like member 84 on opposite sides of an interconnecting segment 85 between the legs of the bracket, said segment having a hole 86 through which the threaded portion of the piston-rod passes. A thrust washer 87 bears against the outer side of each of said rubber-like members to induce compression to said members under the adjusted position of the nuts 88 to axially stabilize the servomotor HS and accommodate universal action thereof with respect to the bracket so that the cylinder 20 may follow the relative path of movement described by the steering drag link 12, the reaction imparted by the abnormally deformed compressed status of the rubber mounting members continuously tending to restore the servomotor HS to normal disposition thus cooperating with the road resistance reaction on the dirigible wheels of the vehicle to return the wheels to straight-line driving.

Operatively disposed in each of said reaction chambers 77, 78 are an annular reaction member 90, 90a respectively, and a pair of Belleville spring washers 91, 91a respectively for biasing said reaction members into their normally abutting relationship with the shoulders 47, 49 aforesaid and adjacent ends respectively of said valve element VE as shown in FIGURE 2. The outer peripheral edges of each pair of cooperating spring washers are engaged and occupy an intermediate position in their respective reaction chambers while the inner peripheral edges of each pair of spring washers are spaced, with one of the inner edges reacting on the reaction member and the other inner edge reacting on the confronting wall 50 or 56 as the case may be, and which, define the outer sides respectively of said chambers as shown. It should be noted that each pair of spring washers is installed under some tension, and that the total deflection induced by relative movement of the reaction member into its associated reaction chamber, is accommodated by the inner edge portions flexing toward each other, which, at maximum deflection deforms each pair of spring washers such that a substantially parallel relation is effected corresponding to full "open" position of the selected (activated) side of the steering control valve VE.

The smoothly finished exterior surface of the sleeve-type valve element VE is defined by a pair of medially disposed external annular lands 92, 93 which define an external annular groove 94 therebetween. Extending in opposite directions from opposite sides of said lands, is a plurality of flats 95, 96 respectively which terminate at their outer ends flush with the ends respectively of said valve sleeve 73. End slots 97, 98 serve to connect said flats with the working chambers 75, 76 respectively as shown. Pressfitted or otherwise mounted on the exterior of each of the portions of said valve sleeve having said flats, is a cylindrical sleeve 101, 102 respectively which terminate at their outer ends flush with the corresponding ends of said sleeve valve 73, with their inner confronting ends spaced from said lands 92, 93 respectively to define a pair of annular fluid chambers 103, 104 respectively which communicate with exposed portions 105, 106 respectively of the surface flats 95, 96 respectively, and therefore, the working chambers 75, 76 respectively. The aforesaid external cylindrical surfaces 105, 106 of each of the cylindrical sleeves 101, 102 respectively are of the same diameter as the external diameters of the valve lands 92, 93 aforesaid, to provide a close tolerance sliding fit between the major diameter of the sleeves 101, 102 and the complemental inner surface 45 defining the bore 44 as shown.

The cylindrical sleeves 101, 102 in assembled status on the flatted portions of the valve element proper, define a plurality of fluid passageways 107, 108 respectively of segment-shaped cross section as shown in FIGURE 4, and the opposite ends of said sleeves terminate flush with the opposite ends of the flatted portions aforesaid, into engagement with the reaction members 90, 90a respectively under influence of said Belleville springs to stabilize the valve element VE in its normal "neutral" position of control. It is thus seen, upon inspecting FIGURE 2, that the two pairs of identical Belleville springs 91 and 91a respectively urge the reaction members into engagement with the shoulders 47, 49 respectively and therefore the valve element VE into its normal "neutral" position, since the valve element is coextensive with the space normally obtaining between the inner exposed faces on the reaction members.

Integral with the medial portion of the cylinder 20 is a pair of exterior embossments 110, 111 of rectangular configuration and which, are preferably circumferentially spaced on said cylinder as shown in FIGURES 2 and 3. An opening 112 is provided through the embossment 110 leading to the bore 44 in the cylinder, and which continuously communicates with an internal annular fluid chamber 113, said chamber being slightly wider than the distance between opposite sides on the valve lands 92, 93 best demonstrated in FIGURE 2 whereby fluid in the opening 112 normally communicates with said opposite sides of the valve lands aforesaid as shown in FIGURE 2. A pair of annular internal fluid channels 114, 115, one on each side of the fluid chamber 113, is formed in the cylindrical surface 45 of the bore 44, said channels being separated from the fluid chamber 113 by interposed annular internal annular valve lands 116, 117 respectively, said last-mentioned lands being normally disposed medially of the fluid chambers 103, 104 respectively whereby fluid from opening 112 normally communicates with the last-mentioned fluid chambers, and thence to the passageways 107, 108 into the reaction and working chambers of the steering-servo HS. A depressed bottom wall 121 defines a variable volume pressure chamber 122 in the embossment 111, said chamber continuously communicating with fluid channels 114, 115 via ports 123, 124 respectively through the wall 121. A flanged closure member or cap 125 is provided for the chamber 122, said cap having an angular embossment 126 formed at one end with a vertical wall 127 through which an opening 128 is provided, and leading from said opening is a flexible conduit 129 having a commercial hydraulic fitting 130 attached as shown to convey fluid pressure from the the outlet side of a circulating pump "HP" which exemplarily illustrates the source of hydraulic pressure. Interconnecting the conduit 129 and a fluid supply reservoir "FR" is a shunt pressure line 131 in which is interposed a spring-loaded pressure regulator valve at "PRV" which functions to return to the reservoir or sump any excess fluid above that required to operate the servomotor HS thereby maintaining a substantially maximum pressure condition in the chamber 116 when the servomotor is activated.

A plurality of cap screws 132 are employed to attach the cap 125 to the embossment 111 in fluid-tight sealed relation by a gasket 133 disposed between the complemental marginal faces on the embossment and flange of the cap as shown. Thus, the cap 125 provides a pressure inlet to the valve element VE.

The opening 112 in the embossment 110 is closed as by a closure member or cap 135 which is formed with an extruded embossment 136 open at one end 137 into which one end of a rigid tubular fitting 138 projects in fluid-tight sealed relation as by soldering or otherwise, and the other (outer) end of said fitting is equipped with a flexible hydraulic conduit 139 connected to the inlet side of the pump HP via said reservoir FR to which the hydraulic fluid is returned from the steering-servo HS via said return conduit 139.

The pump obviously functions to supply a constant flow of hydraulic fluid to the chamber 122, and under control of the valve element VE in a manner to be described. The fluid is selectively displaced under pressure into the working chambers 75, 76 within the steering servomotor HS to activate the latter, and thence outwardly thereof through the channels 114, 115 into the chamber 113 and opening 112 to the return conduit 139 during inactivated status of said steering-servo wherein the working chambers aforesaid retain communication with said channels. Optionally, an accumulator designated as a whole "AC" and illustrated symbolically in FIGURE 1, may be interposed in the pressure conduit 129, and, in which static hydraulic pressure is maintained by said pump. A check-valve is shown at "CV" interposed in the return conduit 139 to maintain a predetermined nonactivating minimum pressure in the working chambers during inactivated status of said servomotor to prevent cavitation therein, which if permitted, would delay energization of the servomotor since the selected working chamber corresponding to the direction of turning of the vehicle would have to be filled before the fluid therein could be pressurized to activate the servomotor to assist in steering the vehicle in the selected direction. A plurality of cap screws 140 is employed to attach the cap 135 to the embossment 110 in fluid-tight sealed relation by a gasket 141 disposed between the complemental marginal faces on the embossment and the cap as shown. Thus, the cap 135 provides a fluid outlet from the valve element VE.

A boss 142 integral with one end of the aforesaid embossment 110 is provided with a bore 143 to connect the opening 112 with the exterior thereof. Slidably disposed in this bore is a shift-rod 144, the inner end of which having a shifting fork 145 rigidly attached thereto as by a hex-nut 146 to enable assembly of the fork in the opening 112, said shifting fork being operatively disposed in the opening 112, and a circular opening is provided through the wall of said embossment into which the hex-nut 146 projects when the shifting fork is operated to one of its extreme positions indicated by dashed lines in FIGURE 8. An expansion plug is used to close the outer end of said circular opening as shown in FIGURES 2 and 8. The inner free end 147 of the shifting fork terminates in a curved surface 148 complemental to the bottom of and slightly spaced from the bottom of said annular groove 94 to provide means for reciprocating the valve element VE to its two extreme "operating" positions and the intermediate "neutral" position of steering control. A suitable annular packing 149 fitted into an internal annular groove 150 in the bore 143 serves to prevent seepage from the opening 112 to the exterior of the cylinder 20. The outer end portion of said shift-rod is pivotally connected to an upstanding pin 151 by means of a link 156 adjustably connected to the shift-rod proper as shown in FIGURES 1 and 2, said link having an eye-end 157 through which said pin 151 projects and is stabilized on the pin as by a cotter pin as shown. The pin 151 is coaxial and integral with a pivot pin 158 rigidly attached at its upper end to the free end of the pitman arm 10 as shown, said pivot pin terminating at its lower end into a spherical element or ball 159 whereby limited relative movement of the ball-end 159 with respect to the drag link 12 imparts corresponding movement to the shift-rod 144 and shifting fork 145 thereby moving the valve element VE an equal distance to place the latter in its different operating positions to control said steering-servo HS as is understood.

The ball-end 159 of the pitman arm 10 operably projects through a suitable opening 161 in the upper side of the hollow or chambered end 162 of the drag link 12. This ball-end is disposed in operative association with a centralizing mechanism or device generally designated "CD" and which comprises: a pair of longitudinally spaced centralizing star-shaped flat springs 164, each having a central hole 165 of such diameter as to receive only a portion of the spherical surface on opposite sides of the ball-end 159 therein. The chamber 162 terminating end of the drag link 12 is closed at its inner end by a wall 166 having a coaxial projection 167 extending outwardly therefrom in normally spaced relationship with respect to the full diameter of the ball-end on the pitman arm, and the open (outer) end of the chamber 162 is closed by a removable plug 168 having a coaxial projection 169 extending inwardly therefrom in normally spaced relationship with respect to the opposite side of the full diameter of the said ball-end, and a split retaining ring 170 engages an internal annular groove 171 adjacent the open end of said chamber 162 to prevent fortuitous displacement of the plug from its normal closing position.

The aforesaid spaces normally obtaining on opposite sides of the full diameter of the ball-end with respect to the confronting projections 167, 169 define the relative operating movement or displacement of the pitman arm 10 with respect to the drag link 12 to operate the valve element VE to its two "operating" positions of control to activate the said steering-servo HS to assist in effecting a right or left turn of the dirigible wheels 16 of the vehicle as the case may be. The holes 165 in the washer springs 164 yieldingly maintain the ball-end 159 substantially coaxial with respect to the drag link, and are preferably installed under tension to urge the ball-end to its normally spaced centralized position with respect to said projections 167, 169 wherein the control valve element VE is disposed in its intermediate position as shown in FIGURE 2 thereby connecting each of the working chambers 75, 76 to the chamber 113, therefore the opening 112 thus inactivating the steering servomotor HS when steering wheel movement is halted during curving or straight-ahead driving of the motor vehicle. In the case of making a turn at extremely slow speeds, road resistance is negligible, and therefore, if steering wheel movement is halted to maintain the vehicle on the curve being negotiated, the valve element VE can assume its "neutral" position as shown in FIGURE 2 until path of travel is changed.

Referring again to the said reaction members and associated Belleville spring washers 91, 91a respectively positioned in the reaction chambers aforesaid, it is important to note that these members and cooperating Belleville springs react on opposite ends of the valve element VE to establish the same in its "neutral" position of control, and therefore cooperate with the centralizing mechanism CD not only to establish the valve element VE in its "neutral" position but also with road resistance through the steered wheels 16 to place the steering mechanism and servomotor HS in a straight-line driving disposition as shown in FIGURE 1 upon removal of manual effort from the steering wheel.

Operation

The manner in which my improved hydraulically-operated steering booster HS functions is believed manifest from the foregoing description. However, in the interest of further clarifications a more detailed consideration will be given to its operational cycle as follows:

Assuming a condition at the instant when the dirigible wheels of the motor vehicle illustrated in FIGURE 1, the disposition of the steering servomotor HS and connected steering and steered parts will be as shown in this figure and FIGURE 2, with the control valve element VE in a relative position corresponding to "neutral" or straight ahead driving of the vehicle. At this instant, that is, with the control valve element VE in the position of FIGURES 1 and 2, hydraulic pressure is conveyed preferably from the pump HP via pressure line 129, chamber 122, ports 123, 124, channels 114, 115, chamber 113, opening 112, chambers 103, 104, passageways 107, 108, slots 97, 98, reaction chambers 77, 78, and thence to the working chambers 75, 76 respectively, and thereby maintaining said chambers, channels, passageways, ports, etc. of the steering-servo HS fully charged with fluid at a minimum non-activating pressure as defined by the setting of the spring-loaded check valve CV interposed in the return line 139. Any excess fluid being released by the check-valve and returned to the fluid supply reservoir FR for recirculation by the pump HP.

At this point in the operating cycle preliminary to the steering-servo HS becoming energized to assist, for example, in effecting a right turn of the vehicle, the centralizing mechanism CD is in disposition shown in FIGURE 5 wherein the pitman arm ball-end 159 is occupying its central intermediate position with respect to the projections 167, 169 under influence of the oppositely reacting springs 164. Also it should be noted that the two pairs of Belleville springs 91, 91a respectively are yieldingly holding the reaction members 90 and 90a respectively in engagement with the internal shoulders 47, 49 in the cylinder 20, and thereby engaging said reaction members with opposite ends respectively of said valve element VE best demonstrated in FIGURES 2 and 2C to establish said valve element in its "neutral" position of control corresponding to the inactivated status of the steering-servo HS. Upon the operator rotating the steering wheel 14 clockwise from his viewpoint, a counterclockwise rotation is imparted to the pitman arm 10 through the worm and sector connection designated by its housing 15 in FIGURE 1. This rotation of the ball-end of the pitman arm 10 is relayed to the centralizing device CD to initially effect relative rotation of the pitman arm with respect to the drag link 12 to thereby actuate the valve element VE through the interconnected shift-rod and fork 144, 145 respectively, said relative movement being accommodated by the space normally obtaining between projection 167 and the full diameter of the ball-end 159 as shown in FIGURE 5, and the yielding of the spring 164 associated with that projection to accommodate reduction of said space.

Accordingly, the valve element VE has been displaced from its normal disposition of FIGURE 2 to its right turn "operating" position shown in FIGURE 8 wherein a portion of the left end of the valve land 92 is circularly aligned with a corresponding portion of the right side of the valve land 116 which serves to isolate the fluid chamber 103 from the fluid chamber 113. Also a portion of the left end of the valve sleeve 102 is disposed in circular alignment with a corresponding portion of the right side of the valve land 117 to thereby isolate the port 124 from the fluid chamber 104 without interrupting communication of the fluid chamber 113 with the chamber 104 and passageways 108 leading to the reaction and working chambers 78, 76 respectively. This isolation of the port 124 with the port 123 in communication with the fluid chamber 103, passageways 107 and reaction and working chambers 77, 75 respectively via the end slots 97 terminating the outer ends of said flats 95, directs fluid under pressure from the chamber 122 under influence of the pump HP into the working chamber 75 to expand the same with consequent movement of the cylinder 20 to the left relative to the stationary piston 23 (see FIGURE 8) to assist in turning the dirigible wheels 16 of the vehicle to effect a right turn thereof.

During this right turn operation of the steering-servo HS, under influence in part of manual effort applied to the steering wheel 14, a proportionally diminutive hydraulic pressure from the working chamber 75 is reacting across the effective end surface on the valve element VE to oppose manual-actuation of the latter to the position shown in FIGURE 8 and thereby providing the operator with physical awareness of the energized assist from the steering-servo HS. This hydraulic reaction is supplemented by the biasing action from the spring 164 in the centralizing device CD and the pair of Belleville springs 91 opposing such movement of the associated reaction member 90 to the position shown in FIGURE 8.

The important advantage gained by utilizing hydraulic reaction in the novel manner herein disclosed, is that a much lighter spring-action in the centralizing device CD can be used, and therefore, initial rotating effort applied to the steering wheel 14 to energize the steering-servo HS is proportionally reduced without sacrificing control as against prior art power steering systems wherein much heavier springs are employed as the sole means of reaction on the steering wheel, and which produce an undesirable "spongy" feel to the steering wheel thus lacking a solid feel of control. With the use of hydraulic reaction each incremental movement of the steering wheel 14 relays to the operator a more solid and positive "feel" of the energized status of the steering-servo HS and thereby serves to prevent any possibility of "over-steering" since the operator is required to overcome this hydraulic reaction before energization can be increased to oppose road resistance reacting through the steering linkage to the steering wheel 14.

This completes what may be termed a "right turn" of the vehicle, and upon operator force being removed from the steering wheel or with slight effort to rotate the wheel in the opposite direction to establish the vehicle in a straight-line of driving, the reaction from the dirigible wheels through the steering linkage in cooperation with hydraulic reaction on the activated reaction member 90 or 90a and reaction from springs 164 and 91, the normal "neutral" relative disposition of the steering-servo and connected linkage are restored as demonstrated in FIGURES 1 and 2 wherein the working chambers 75, 76 are again placed in communication with the return line 139 with a minimum non-activating pressure effective therein according to the preset status of the check-valve CV. Accordingly, the springs 164, 91 or 164, 91a combined with the normal hydraulic reaction effective against opposite ends of the valve element VE, serve to stabilize the vehicle in straight-ahead driving whereby only slight operator effort is required to keep the vehicle on a straight course, and where a smooth roadbed is being negotiated the weight of the hands would serve fully to keep the vehicle on a straight path.

During the activated status of the steering-servo HS to assist in making a right turn, it should be importantly noted that the opposite working chamber 76 is proportionally reduced in size and therefore volume of fluid therein is correspondingly reduced. Such excess fluid is conveyed from said working chamber via its associated reaction chamber 78, passageways 108, chamber 104, chamber 113 to opening 112, and thence through the return line 139 via the check valve CV back to the reservoir for recirculation by the pump HS.

When the steering-servo and control valve element VE therefor are being restored to normal disposition as demonstrated in FIGURE 2, the working chamber 76 and associated fluid chambers and channels are maintained filled to prevent cavitation made possible by the enlargement of this working chamber to normal size, by fluid introduced therein as a consequence of the left end portion of the valve sleeve 102 being disposed out of circular alignment with respect to the right side portion of the internal valve land 117 thereby placing the port 124, chamber 104, passageways 108, and chamber 113 in communication with the pressure chamber 122 to enable minimum non-activating pressures to be established in both of the working chambers 75, 76 as a function of the preloaded status of the check-valve CV.

From the foregoing operational cycle, it is manifest that movement of the valve element VE to the left as viewed in FIGURE 2 to the position shown in FIGURE 8, is effective to control the steering-servo HS to assist in making a "right" turn, while movement of the valve element in the opposite direction from "neutral" to the dashed line position is effective to control the steering-servo to assist in making a "left" turn.

For the purpose of exemplification, only the operating cycle of my hydraulic steering-servo has been explained for executing a right turn. For accomplishing a left turn, the steering wheel 14 would be rotated in a counterclockwise direction from the driver's viewpoint, causing opposite relative positioning of the valve element VE shown in dashed lines in FIGURE 8, with respect to the cylinder 20 wherein the corresponding centering spring 164 is oppositely deflected from its normally preloaded status to accommodate relative movement of the ball end 159 of the pitman arm 10 toward projection 167. Such movement of the valve element VE would thus isolate the fluid chamber 113 from the fluid channel 115 and thereby induce pressurization of the fluid in the working chamber 76 and associated reaction chamber 78, and at the same time, vent the fluid chamber 113 to the fluid channel 114 to enable fluid in the working chamber 75 to return to the fluid reservoir via return line 139 as a consequence of reducing the size of this latter working chamber as the other chamber 76 is expanded under influence of fluid pressure to render power assistance effective to change the direction of the vehicle to the left as is understood.

During such left steering of the vehicle, the reaction member 90a opposed by its pair of associated Belleville springs 91a in reaction chamber 78, has been moved out of abutting relationship with the shoulder 49, while the shoulder 47 corresponding to a right turn is abutted by the reaction member 90 in the reaction chamber 77 under influence of its pair of Belleville springs 91 but the corresponding end of the valve element VE has moved away from this latter reaction member a distance corresponding to the movement of the valve element required to induce left turning of the vehicle.

It is thus seen that the valve element VE is normally balanced in "neutral" position as shown in FIGURES 1 and 2 for straight-ahead driving or when road reaction from the dirigible wheels is at a minimum enabling the valve element and cylinder of the steering-servo HS to assume their relative neutral positions, but when the valve element is displaced in either direction from "neutral," the steering-servo HS is activated to assist in turning the vehicle in the selected direction.

It should be recognized from the present disclosure on reference to FIGURE 6, that the spaces normally obtaining between the projections 167, 169 on opposite sides of the full diameter of the ball end 159 of the pitman arm 10, establish the limits of relative movement of the pitman arm with respect to the steering linkage to operate the control valve VE to its two operating "on" positions of control best demonstrated in FIGURE 8. When this relative operating movement is taken up during a right or left turn from normal "neutral" position, wherein the selected projection 167 or 169 corresponding to the steering direction becomes engaged with the pitman arm ball end whereby the driver can apply manual effort directly to the steering linkage system to steer the ground members of the vehicle in cooperation with the steering-servo HS or independently thereof, should power failure occur due to loss of hydraulic pressure or for other reasons that may cause the steering-servo to become ineffective to assist in such manual steering effort.

The central holes 165 in the centralizing springs 164, serve to maintain the ball end of the pitman arm 10 in substantially coaxial disposition with respect to the connected end of the drag link 12, and to insure correct operating alignment with the springs 164 disposed on opposite sides of the ball end 159.

It should be importantly observed in connection with the direct actuation of the steering linkage system by manual effort in the manner above described, that the projections 167, 169 are selectively engaged by the ball end 159 of the pitman arm 10, slightly in advance of opposite ends of the valve sleeve 73 displacing the selected thrust or reaction member 90 or 90a to a position whereat the associated pair of Belleville washer springs 91, 91a respectively is substantially flattened so that the corresponding end of the valve sleeve 73 acts at all times through the said washer-spring and never directly on the corresponding end of the power cylinder 20. This is a preferred operating relationship between the valve sleeve 73 and power cylinder 20, however, the ends of the valve sleeve 73 may be brought into direct engagement with the closure walls 50, 56 depending on the direction of the movement of the valve sleeve to its selected operating position, through the intermediary of the Belleville springs 91, 91a deformed into parallel relation with the confronting faces on said closure walls, to serve as the means for directly actuating the power cylinder by manual effort applied to the steering wheel, or to assist said power cylinder. In the latter case, however, it will be appreciated that such heavy thrusts from manually steering the vehicle are applied through the valve sleeve rather than through or possibly in cooperation with the centralizing device CD when the projections 167, 169 are selectively engaged by the ball-end 159 of the pitman arm 10. Such heavy thrusts by the ball-end may tend to disturb the "floating" fluid-tight working relationship between said valve sleeve 73 and complemental surface 45 in the bore 44, and eventually cause some seepage and therefore power-loss. It is therefore seen that in the former arrangement where such heavy thrusts are absorbed by the projections 167, 169 to directly operate the steering linkage, the valve element VE only receives the forces necessary to effect sliding movement of the same to its different operating positions of control under influence of the turning movement of the steering wheel transmitted to the shift-rod 144.

The centralizing device CD shown in FIGURES 5, 6 and 7, is capable of stabilizing the steering linkage system in "neutral" normal position as shown in FIGURE 1 with respect to the connected end of the steering pitman arm 10 upon manual turning effort being relieved from the steering wheel, and it is this novel "centralizing device" which cooperates with the reaction members 90, 90a and Belleville springs 91, 91a incorporated in the servo-cylinder 20, to yieldably stabilize the movable valve element VE in its corresponding positions of control with respect to those of the steering linkage system; namely, "neutral," "right" and "left" positions. Such stabilizing action being induced by the aforesaid reactionay forces transmitted by the rubber collars 84 which serve to anchor the outer end of the piston rod 71 to the vehicle frame member as shown, and the above centralizing mechanisms; namely, members and springs 90, 90a and 91, 91a respectively and device CD, when disposed out of their respective normal positions shown in FIGURES 1 and 2 and the ground wheels 16, as a consequence of steering the vehicle to either the right or left as the case may be.

Thus, in like manner to the right turn aforesaid described, the two centralizing mechanisms aforesaid cooperate with the pliant mounting member 84, to continuously urge the power cylinder 20 and valve element VE toward balanced relative positions portrayed in FIGURES 2 and 6, but while the valve element is maintained in any degree of "cracking" the channels 114, 115 as the case may be as shown in FIGURE 8, the cylinder 20 of the steering-servo HS is being biased to the left from medial neutral position as viewed in FIGURE 2, to turn the dirigible wheels in cooperation with manual force exerted at the steering wheel. This cooperative biasing action effective when the vehicle wheels are out of straight path guidance of the vehicle is also augmented by the reaction from the dirigible wheels in contact with the road surface tending at all times to assume a straight path of travel from an arcuate path effective as when a turn is being executed.

The steering control valve SV of the present invention possesses a unique feature with respect to receiving at its opposite ends a diminutive reaction pressure from the corresponding working chamber 75, 76 whichever is activated, to enable the operator to sense a more "solid" feel of steering reaction than when relying solely on spring means for such purpose, and therefore, a more natural feel is provided with reduced effort for predictable steering control under all driving conditions of the vehicle.

The simplicity and economy of the sleeve-type valve forming a unitary assembly with the hydraulic power cylinder in which the valve is slidably disposed, reduce the number of pressure lines leading from the pump to one as against two pressure lines commonly used between the control valve and steering cylinder, and the number of fittings, connections, etc., are materially reduced to produce a very compact power steering unit at less cost not heretofore appreciated by workers in the art.

The present invention is concerned with a follow-up booster steering mechanism for motor vehicles wherein a new and improved type of hydraulic booster motor is employed in conjunction with the conventional manually-controlled steering components, to provide highly desirable characteristics in steering wheel operation and control during power boost. Aside from the use of the motor in a booster steering mechanism, the novel motor is capable of application in other uses, and therefore, such motor per se forms the subject-matter of certain of the claims appended hereto.

The invention further contemplates that the hydrualic cylinder 20 may be utilized for double-action as shown, or for single-action wherein only one end of the cylinder, is employed, and further, that the hydraulic cylinder may be applied to have stationary status with respect to the piston movably disposed therein or vice versa as herein illustrated.

Reference is now made to the terminology used in the foregoing description and in the appended claims, wherein the identifying expressions and/or terms employed are intended to convey meanings which include the range of reasonable equivalents in the patent sense. For example, the expressions, "servomotor," "steering-servo," "power cylinder," "casing," etc., are intended to include any casing and/or chamber having a member therein movable relatively to each other or the casing with respect to the member or vice versa. The terms "front," "rear," "right," "left," "straight-ahead," "up," "down," "bottom," "top," and other directional words or characters are intended to have only relative connotation for convenience in describing the structure as illustrated, and are not intended to be interpreted as requiring any particular orientation with respect to associated structure external to the present disclosure except such terms as may relate to the path of movement of the vehicle.

A preferred embodiment of the invention has been illustrated and described. It should be understood, however, that the invention contemplates any and all modifications, substitutions, variations and arrangements thereof that may fall within the purview of the claims hereunto appended.

Having thus described my invention, I claim:

1. In steering mechanism for motor vehicles having an element adapted to be moved to perform work, a source of pressurized fluid, a manual actuator, a stationary piston, and mechanical means interconnecting said manual actuator with said work performing element, a double-acting power cylinder slidably receiving said piston and combining therewith to provide a pressure-fluid motor characterized by a pair of working chambers by which power is applied through a connection to said work performing element for assisting said manual actuator a longitudinal bore substantially coextensive with said power cylinder, the improvement which comprises: valve means including a tubular valve element relatively slidable with respect to said power cylinder and piston in telescopic relationship thereto, with one portion of said valve element having continuous communication with said source of fluid pressure and another portion thereof being connected to said manual actuator for movement therewith, said one portion of the valve element having the function of selectively controlling the inlet to and exit of the fluid pressure from said source applied to and exhausted from said working chambers respectively to interconnect the same and thereby balance pressures in said working chambers enabling said power cylinder to assume a neutral position wherein said piston is intermediately disposed, and to isolate said working chambers and thereby render differential pressures effective in said working chambers to move said power cylinder in opposite directions from its neutral position aforesaid; passageway means interconnecting said working chambers with opposed surface portions on said valve element respectively to impress on said surface portions diminutive proportional reaction in accordance with pressure conditions on the fluid within said working chambers and thereby impress similar reactive forces on said manual actuator connected to said valve element; a force-transmitting connection in said mechanical means, said connection having a predetermined take-up clearance therein and being chambered to enclose a pair of spaced apart movable walls disposed in opposition to each other and effective to yieldingly oppose the take-up of the aforesaid clearance, said movable walls being spring-biased toward each other into engagement with a portion of said manual actuator operatively positioned therebetween, and being adapted to yield under influence of said manual actuator as a function of reaction from said work performing element to selectively accommodate movement of said valve element to its two operating positions aforesaid.

2. In a steering mechanism for a motor vehicle having a steering wheel and a steering gear connected to the steered wheels of the vehicle, a stationary piston, and a motion-transmitting connection enabling limited relative movement therein and operatively interconnecting said steering gear with said steered wheels, a source of pressurized fluid, a double-acting power cylinder slidably receiving said piston and combining therewith to provide a differential fluid pressure motor characterized by a pair of opposed working chambers by which power is applied through a connection to said steered wheels for assisting said steering wheel to steer the same, the improvement which comprises; control valve means having a cylindrical sleeve-type element movable relatively to and in unison with said power cylinder, said valve element being movable wholly within said power cylinder between the latter and said piston to receive proportionally reduced reaction from the pressurized fluid in said working chambers, and adapted to have continuous communication with said source of fluid pressure; mechanical means interconnecting said steering gear with said steered wheels, said means including a force-transmitting connection having a predetermined take-up clearance therein and being chambered to enclose a pair of spaced apart movable walls disposed in opposition to each other and effective to yieldingly oppose the take-up of the aforesaid clearance, said movable walls being spring-biased toward each other into engagement with an interposed portion of said steering gear for movement as a unit thereby opposing take-up of said clearance, and being adapted to yield under influence of said manual force exerted on said steering wheel as a function of the reaction from said steered wheels to accommodate selective movement of said valve element from neutral position wherein said piston is intermediately disposed with respect to said power cylinder and pressures in the working chambers thereof balanced, to opposed operating positions to produce differential pressures in said working chambers to move said power cylinder in opposite directions to assist in steering said steered wheels accordingly, and wherein said working chambers are selectively connected and disconnected from said source of fluid pressure to effect said differential pressures.

3. A motor vehicle steering mechanism constructed in accordance with claim 2 wherein said power cylinder comprises: a cylindrical wall provided with a pair of exterior circumferentially spaced embossments; a longitudinal bore which terminates at each end into first and second counterbores respectively; first and second spaced apart internal annular shoulders defined by each end of said longitudinal bore and associated first and second counterbores respectively; a fluid cavity in one of said embossments in continuous communication with said return line; a fluid cavity in the other embossment in continuous communication with said pressure line; an annular fluid chamber in the surface of said longitudinal bore in continuous communication with said first-mentioned cavity; a pair of annular fluid channels in the surface of said longitudinal bore, said channels being on opposite sides respectively of said fluid chamber; a pair of inner annular working lands disposed between each of said fluid channels respectively and said fluid chamber; a pair of fluid openings for connecting said fluid channels with said first-mentioned cavity; a pair of removable end walls for closing the opposite second counterbores, one of said walls being provided with a central aperture; a piston rod slidably projecting through said aperture to the exterior of said power cylinder; a pair of annular pressure reaction chambers defined by said first counterbores, associated first annular shoulders and confronting face portions on said end walls respectively; an annular thrust member operably disposed in each of said reaction chambers in normally abutting relationship with each of said first annular shoulders; and a normally preloaded dished washer-type spring operably disposed in each of said reaction chambers to react between said thrust members and associated end walls to bias said members into normal abutting relationship with said first annular shoulders.

4. A motor vehicle steering mechanism constructed in accordance with claim 3 wherein said sleeve-type element of said control valve means comprises: a cylindrical sleeve slidably disposed in said longitudinal bore between said power cylinder and piston, in fluid-tight sealed relationship, with opposite ends of said sleeve normally abutting said thrust members respectively; an inner cylindrical sleeve surface in which said piston is slidably interfitted in fluid-tight sealed relationship to define said working chambers on opposite sides thereof in said power cylinder; an intermediate outer annular working land of less width than said fluid chamber, and adapted to cooperate with said inner working lands in the power cylinder; an annular groove in said outer working land medially disposed thereof; an annular outer fluid channel on each side of said outer annular land, and normally disposed in circular alignment with the inner working lands aforesaid, the latter being of less width than said outer channels; a plurality of longitudinal fluid passageways in the sleeve leading in opposite directions from said outer fluid channels to opposite ends of said sleeve; a corresponding number of radial fluid passageways through a portion of the sleeve for interconnecting said longitudinal fluid passageways with said working chambers respectively; a shifting member slidably disposed in said first-mentioned cavity, with a portion thereof engaging the annular groove aforesaid to impart sliding movement to said valve sleeve; a shift rod projecting from the exterior of said one embossment through a sealed bore therein into engagement with another portion of said shifting member, to interconnect said valve sleeve with said steering gear for movement as a unit to selectively connect and disconnect said first-mentioned fluid channels from said longitudinal passageways by moving corresponding ends of the latter channels into lapping relationship with corresponding ends of said inner working lands, to thereby isolate said working chambers to enable pressure build-up in the selected working chamber and simultaneously vent the other working chamber to said annular chamber for the fluid therein to displace through the return line, to enable movement of the power cylinder in the selected direction.

5. In power boosting mechanism comprising: a source of pressurized fluid; a fluid pressure working chamber; a pair of fluid pressure reaction chambers communicating with opposite ends respectively of said fluid working chamber; a double-acting piston within said fluid working chamber, a piston rod extending from said piston to the exterior of said fluid working chamber; control valve means having an element movable relatively to said working chamber and to said piston, said valve element being adapted to receive fluid pressure reaction on opposite ends thereof from said reaction chambers respectively; passage means for conducting working fluid from said fluid pressure source to a portion of said valve element into said working and reaction chamber; other passage means for conducting fluid from said working and reaction chambers in excess of a predetermined minimum non-activating pressure back to said fluid pressure source for recirculation thereby via said first-named passage means in the normal disposition of said working chamber and piston; working portions on said valve element in operative association with both of said passage means for selectively controlling the passage of fluid from said fluid pressure source to said working and reaction chambers on either side of said piston to activate said mechanism; spring means having a pair of relatively movable elements opposed by a pair of normally preloaded springs respectively, to establish the normal relative disposition of said working chamber and said piston to supplement the function of proportional pressure reaction in said reaction chambers on said valve element; and a manually-operated member joined to said valve element to operate the same in opposition to said spring means, said member being normally engaged by both of said movable elements.

6. A power boosting mechanism constructed in accordance with claim 5 wherein both of said passage means are normally open to accommodate the continuous circulation of fluid at said minimum pressure through each of the opposed working chambers and associated reaction chambers respectively, and said working portions on said valve element being movable relatively to said working chambers to vary the degree of restriction of the continuous circulation through both of said passage means.

7. A power boosting mechanism constructed in accordance with claim 6 wherein said other passage means include a check-valve spring-loaded to oppose return of fluid to said fluid pressure source whereby said minimum non-activating pressure is maintained on the fluid within said working and reaction chambers and portion on said valve element, in accordance with said spring load to prevent cavitation in the fluid column between said source and said mechanism.

8. In power boosting mechanism comprising: a source of pressurized fluid; a fluid pressure working chamber; a fluid pressure reaction chamber at one end of said working chamber; a single acting piston within said working chamber; a piston rod extending from said piston to the exterior of said working chamber; control valve means having an element movable between and relatively to said working chamber and to said piston, said valve element being adapted to receive fluid pressure reaction on one end thereof from said reaction chamber; passage means for conducting working fluid from said fluid pressure source to a portion of said valve element into said working and reaction chambers; other passage means for conducting fluid from said working and reaction chambers in excess of a predetermined minimum non-activating pressure back to said fluid pressure source for recirculation thereby via said first-named passage means in the normal disposition of said working chamber and piston; a working portion on said valve element in operative association with both of said passage means for selectively controlling the passage of fluid from said fluid pressure source to said working and reaction chambers on one side of said piston to activate said mechanism; spring means having a pair of relatively movable elements opposed by a normally preloaded spring to establish the normal relative disposition of said working chamber and said piston to supplement the function of proportional hydraulic reaction in the associated reaction chamber on said valve element; and a manually-operated member joined to said valve element, said member being normally engaged by both of said movable elements.

9. In power boosting mechanism comprising: a source of pressurized fluid; a movable double-acting fluid chamber enclosure; a stationary piston dividing said fluid chamber into opposing fluid pressure working chambers; a piston rod extending from said piston to the exterior of said fluid chamber; a pair of fluid pressure reaction chambers communicating with opposite ends of said working chambers respectively; control valve means having an element movable relatively to said working chambers and to said piston, said valve element being adapted to receive fluid pressure reaction on opposite ends thereof from said reaction chambers respectively; passage means for conducting working fluid from said fluid pressure source to a portion on said valve element into said working and reaction chambers; other passage means for conducting fluid from said working and reaction chambers in excess of a predetermined minimum non-activating pressure back to said fluid pressure source for recirculation thereby via said first-named passage means in the normal relative disposition of said fluid chamber enclosure and piston; working portions on said valve element in operative association with both of said passage means for selectively controlling the passage of fluid from said fluid pressure source to said working and reaction chambers on either side of said piston to activate said mechanism; a pair of movable elements, one in each reaction chamber, normally engaging opposite ends respectively of said valve element to establish normal disposition of the latter; a pair of normally preloaded springs, one in each reaction chamber, reacting between said fluid chamber enclosure and said movable elements respectively to bias the latter into normal engagement with opposite ends respectively of said valve element to establish normal relative disposition of said fluid chamber enclosure and said valve element, to supplement the function of proportional pressure reaction in the effective reaction chamber on the end of the valve element adjacent thereto; and a manually-operated member joined to said valve element to operate the same in selective opposition to said springs and said fluid pressure reactions.

10. In power boosting mechanism comprising: a source of pressurized fluid; a movable fluid chamber enclosure; a stationary piston dividing said chamber into opposing fluid pressure chambers, one of said chambers being adapted to receive working fluid; a piston rod extending from said piston to the exterior of said fluid chamber enclosure; a fluid pressure reaction chamber communicating with the end of one of said pressure working chambers; control valve means having an element movable relatively to said working chamber and to said piston, said valve element being adapted to receive fluid pressure reaction on the end exposed to said reaction chamber; passage means for conducting working fluid from said fluid pressure source to a portion on said valve element into said working and associated reaction chambers; other passage means for conducting fluid from said working and reaction chambers in excess of a predetermined minimum non-activating pressure back to said fluid pressure source for recirculation thereby via said first-named passage means in the normal relative disposition of said fluid chamber enclosure and said piston; a working portion on said valve element in operative association with both of said passage means for selectively controlling passage of fluid from said fluid pressure source to said working and reaction chambers on one side of said piston to activate said mechanism; a movable element normally engaging a portion on said fluid chamber enclosure and said valve element to establish the normal relative disposition thereof; a normally preloaded spring reacting between said fluid chamber enclosure and said movable element to bias the latter to normal disposition aforesaid to supplement the function of proportional pressure reaction on said valve element; and a manually-operated member joined to said valve element to operate the same in opposition to said spring and said fluid pressure reaction.

11. In a booster servo having an axially bored double-acting cylinder closed at both ends and movable to perform work, and which is provided with an inlet chamber spaced from an outlet chamber, a source of hydraulic pressure production, a conduit for supplying pressurized working fluid from said source to said inlet chamber, another conduit for returning said fluid at non-working pressure from said outlet chamber to said source, a piston having a piston-rod projecting through one end of said cylinder to its exterior, said piston normally occupying an intermediate axially fixed position with respect to the bore of said cylinder in circularly spaced relation thereto, and a pair of opposed working chambers defined by opposite sides of said piston and confronting opposite ends, respectively, of said cylinder, the improvement which comprises: an elongated valve-sleeve substantially coextensive with the bore of said cylinder and axially slidable therein through the circular space between the cylinder bore and piston in fluid-tight working relationship therewith, whereby the bore of the valve-sleeve provides the cylindrical portion of the said working chambers; a pair of longitudinally spaced annular fluid channels indented in the cylinder bore intermediately thereof; a third annular fluid channel indented in the longitudinal space aforesaid between said pair of fluid channels; a pair of annular working lands defined by that portion of the cylinder bore coextensive with the remaining longitudinal space aforesaid on opposite sides, respectively, of said third fluid channel; an annular working land on the valve-sleeve, and which is normally positioned in spaced relation with respect to opposite sides of said third fluid channel, the working lands on the cylinder and the valve-sleeve cooperating to provide fluid communication to and from said working chambers; a pair of ports for interconnecting said pair of fluid channels with said inlet chamber; a third port for interconnecting said outlet chamber with said third fluid channel; a pair of longitudinally spaced fluid channels indented in the outer cylindrical surface of said valve-sleeve, one on each side of said third working land, and normally in circular alignment with the aforesaid pair of fluid channels, respectively, indented in the bore of said cylinder whereby substantially unrestricted circulation of fluid at non-working pressure from said source and return is accommodated; a pair of fluid passages incorporated in the wall of said valve-sleeve for interconnecting said pair of fluid channels therein with their respective working chambers aforesaid; means for moving said valve-sleeve relatively to said cylinder and piston, to effect selective communication of said pair of fluid channels of said cylinder with the pair of fluid channels, respectively, in said valve-sleeve wherein said third fluid channel in the bore of said cylinder is isolated from the registering channels effective to convey fluid at working pressure to the selected working chamber and thereby induce corresponding movement of said cylinder by hydraulic pressure; and means for limiting the movement of said valve-sleeve relative to said cylinder and piston.

12. In a booster servo having an axially bored double-acting cylinder closed at both ends and movable to perform work, and which is provided with an inlet chamber spaced from an outlet chamber, a source of hydraulic pressure production, a conduit for supplying pressurized working fluid from said source to said inlet chamber, another conduit for returning said fluid at non-working pressure from said outlet chamber to said source, a piston having a piston-rod projecting through one end of said cylinder to its exterior, said piston normally occupying an intermediate axially fixed position with respect to the bore of said cylinder in circularly spaced relation thereto, and a pair of opposed working chambers defined by opposite sides of said piston and confronting opposite ends, respectively, of said cylinder, the improvement which comprises: an elongated valve-sleeve substantially coextensive with the bore of said cylinder and axially slidable therein through the said circular space between the cylinder bore and piston in fluid-tight working relationship therewith whereby the bore of the valve-sleeve provides the cylindrical portion of the said working chambers; a pair of longitudinally spaced annular fluid channels indented in the cylinder bore intermediately thereof; a third annular fluid channel indented in the longitudinal space aforesaid between said pair of fluid channels; a pair of annular working lands defined by that portion of the cylinder bore coextensive with the remaining longitudinal space aforesaid on opposite sides, respectively, of said third fluid channel; an annular working land on the valve-sleeve, and which is normally positioned in spaced relation with respect to opposite sides of said third fluid channel, the working lands on the cylinder and the valve-sleeve cooperating to provide fluid communication to and from said working chambers; a pair of ports for interconnecting said pair of fluid channels with said inlet chamber; a third port for interconnecting said outlet chamber with said third fluid channel; a pair of longitudinally spaced fluid channels indented in the outer cylindrical surface of said valve-sleeve, one on each side of said third working land, and normally in circular alignment with the aforesaid pair of fluid channels respectively indented in the bore of said cylinder whereby substantially unrestricted circulation of fluid at non-working pressure from said source and return is accommodated; a pair of fluid passages incorporated in the wall of said valve-sleeve for interconnecting said pair of fluid channels therein with their respective working chambers aforesaid; a pair of reaction chambers at the outer ends, respectively, of said working chambers, defined by the opposite ends of said valve-sleeve and confronting face portions of the opposite ends, respectively, of said cylinder, said fluid passages in said valve-sleeve communicating via said reaction chambers with their respective working chambers whereby diminutive hydraulic reaction proportionate to the effective working pressure in the activated working chamber, is selectively impressed on the corresponding end of said valve-sleeve; means for moving said valve-sleeve relatively to said cylinder and piston, to effectuate selective communication of said pair of fluid channels in the bore of said cylinder with the pair of fluid channels, respectively, in said valve-sleeve wherein said third fluid channel in the bore of said cylinder is isolated from the registering channels between said cylinder and valve-sleeve effective to convey fluid at working pressure to the selected working chamber and thereby induce corresponding movement of said cylinder by hydraulic pressure; and means for limiting the movement of said valve-sleeve relative to said cylinder and piston.

13. In a booster servo having an axially bored double-acting cylinder closed at both ends and movable to perform work, and which is provided with an inlet chamber spaced from an outlet chamber, a source of hydraulic pressure production, a conduit for supplying pressurized working fluid from said source to said inlet chamber, another conduit for returning said fluid at non-working pressure from said outlet chamber to said source, a piston having a piston-rod projecting through one end of said cylinder to its exterior, said piston normally occupying an intermediate axially fixed position with respect to the bore of said cylinder in circularly spaced relation thereto, and a pair of opposed working chambers defined by opposite sides of said piston and confronting opposite ends, respectively, of said cylinder, the improvement which comprises: an elongated valve-sleeve substantially coextensive with the bore in said cylinder and axially slidable therein through the said circular space between the cylinder and piston in fluid-tight working relationship therewith whereby the bore of the valve-sleeve provides the cylindrical portion of the said working chambers; a pair of longitudinally spaced annular fluid channels indented in the cylinder bore intermediately thereof; a third annular fluid channel indented in the longitudinal space aforesaid between said pair of fluid channels; a pair of annular working lands defined by that portion of the cylinder bore coextensive with the remaining longitudinal space aforesaid on opposite sides, respectively, of said third fluid channel; an annular working land on the valve-sleeve, and which is normally positioned in spaced relation with respect to opposite sides of said third fluid channel, the working lands on the cylinder and the valve-sleeve cooperating to provide fluid communication to and from said working chambers; a pair of ports for interconnecting said pair of fluid channels with said inlet chamber; a third port for interconnecting said outlet chamber with said third fluid channel; a pair of longitudinally spaced fluid channels indented in the outer cylindrical surface of said valve-sleeve, one on each side of said third working land, and normally in circular alignment with the aforesaid pair of fluid channels, respectively, indented in the bore of said cylinder whereby substantially unrestricted circulation of fluid at non-working pressure from said source and return is accommodated; a pair of fluid passages incorporated in the wall of said valve-sleeve for interconnecting said pair of fluid channels therein with their respective working chambers aforesaid; a pair of reaction chambers at the outer ends, respectively, of said working chambers, defined by the opposite ends of said valve-sleeve and confronting face portions of the opposite ends, respectively, of said cylinder; spring means including a normally preloaded spring operably disposed within each of said reaction chambers to react between the opposite ends of said valve-sleeve and confronting face portions on the ends of said cylinder, respectively, whereby movement of the valve-sleeve relative to said cylinder is yieldably opposed by the spring in the reaction chamber corresponding to the selected working chamber activated by such movement of the valve-sleeve, with both of said springs being effective to bias the cylinder and valve-sleeve to their respective normal neutral positions wherein fluid at non-working pressure is circulated from said source through the registering fluid channels of the cylinder and valve-sleeve, back to the source for recirculation in readiness for pressurization to activate the cylinder according to relative positioning of the valve-sleeve; means for moving said valve-sleeve relatively to said cylinder and piston, to effectuate selective communication of said pair of fluid channels in the bore of said cylinder with the pair of fluid channels, respectively, in said valve-sleeve wherein said third fluid channel in the bore of said cylinder is isolated from the registering channels between said cylinder and valve-sleeve effective to convey fluid at working pressure to the selected working chamber and thereby induce corresponding movement of said cylinder by hydraulic pressure; and means for limiting the movement of said valve-sleeve relative to said cylinder and piston.

14. In a booster servo having an axially bored double-acting cylinder closed at both ends and movable to perform work, and which is provided with an inlet chamber spaced from an outlet chamber, a source of hydraulic pressure production, a conduit for supplying pressurized working fluid from said source to said inlet chamber, another conduit for returning said fluid at non-working pressure from said outlet chamber to said source, a piston having a piston-rod projecting through one end of said cylinder to its exterior, said piston normally occupying an intermediate axially fixed position with respect to the bore of said cylinder in circularly spaced relation thereto, and a pair of opposed working chambers defined by opposite sides of said piston and confronting opposite ends, respectively, of said cylinder, the improvement which comprises: an elongated valve-sleeve substantially coextensive with the bore of said cylinder and axially slidable therein through the said circular space between the cylinder bore and piston in fluid-tight working relationship therewith whereby the bore of the valve-sleeve provides the cylindrical portion of the said working chambers; a pair of longitudinally spaced annular fluid channels indented in the cylinder bore intermediately thereof; a third annular fluid channel indented in the longitudinal space aforesaid between said pair of fluid channels; a pair of annular working lands defined by that portion of the cylinder bore coextensive with the remaining longitudinal space aforesaid on opposite sides, respectively, of said third fluid channel; an annular working land on the valve-sleeve, and which is normally positioned in spaced relation with respect to opposite sides of said third fluid channel, the working lands on the cylinder and the valve-sleeve cooperating to provide fluid communication to and from said working chambers; a pair of ports for interconnecting said pair of fluid channels with said inlet chamber; a third port for interconnecting said outlet chamber with said third fluid channel; a pair of longitudinally spaced fluid channels indented in the outer cylindrical surface of said valve-sleeve, one on each side of said third working land, and normally in circular alignment with the aforesaid pair of fluid channels, respectively, indented in the bore of said cylinder whereby substantially unrestricted circulation of the fluid at non-working pressure from said source and return is accommodated; a pair of fluid passages incorporated in the wall of said valve-sleeve for interconnecting said pair of fluid channels therein with their respective working chambers aforesaid; a pair of reaction chambers on opposite ends, respectively, of said working chambers, defined by opposite ends of said valve-sleeve and confronting face portions of the ends, respectively, of said cylinder, said fluid passages in said valve-sleeve communicating via said reaction chambers with their respective working chambers whereby diminutive hydraulic reaction proportionate to the effective working pressure in the activated working chamber is selectively impressed on the corresponding end of said valve-sleeve; spring means including a normally preloaded spring incorporated within each of said reaction chambers to selectively react on opposite ends of said valve-sleeve and confronting face portions of the ends of said cylinder whereby reaction from said springs cooperates with the effective hydraulic reaction to provide yieldable resistance to movement of said valve-sleeve in a servo-activating direction; means for moving said valve-sleeve relatively to said cylinder and piston, to effectuate communication of said pair of fluid channels in the bore of said cylinder with the pair of fluid channels, respectively, in said valve-sleeve wherein said third fluid channel in the bore of said cylinder is isolated from the registering channels effective to convey fluid at working pressure to the selected working chamber and thereby induce corresponding movement of said cylinder by hydraulic pressure; and means for limiting the movement of said valve-sleeve relative to said cylinder and piston.

15. In a booster servo, the combination of an axially bored cylinder movable to perform work, and having a pair of spaced ports, and a pair of conduits leading from said ports, respectively, one to a source of hydraulic pressure and the other to a supply reservoir; a channeled valve-sleeve axially slidable within the bore of the cylinder, the ports of the cylinder and the channels of the valve-sleeve cooperating to provide fluid communication to and from the bore in the latter; a piston fixedly positioned within the bore of the valve-sleeve; and means for moving said valve-sleeve relatively to said cylinder and piston to control selective communication of said channels with said ports and to thereby cause corresponding movement of the cylinder by hydraulic pressure.

16. In a booster servo, the combination of an axially bored cylinder movable to perform work, and having a pair of spaced ports, and a pair of conduits leading from said ports, respectively, one to a source of hydraulic pressure production and the other to a supply reservoir; a channeled valve-sleeve substantially coextensive with and axially slidable within the bore of said cylinder, the ports of the cylinder and the channels of the valve-sleeve cooperating to provide fluid communication to and from the bore in the latter; a piston fixedly positioned within the bore of the valve-sleeve; means for moving said valve-sleeve relatively to said cylinder and piston, to control selective communication of said channels with said ports and to thereby cause corresponding movement of the cylinder by hydraulic pressure; and means for limiting the movement of said valve-sleeve relative to said cylinder and piston.

References Cited in the file of this patent

UNITED STATES PATENTS

| | | |
|---|---|---|
| 1,874,248 | Davis | Aug. 30, 1932 |
| 2,048,978 | Tait | July 28, 1936 |
| 2,220,339 | Leathem | Nov. 5, 1940 |
| 2,647,492 | Puerner | Aug. 4, 1953 |
| 2,711,797 | Muller | June 28, 1955 |
| 2,757,748 | MacDuff | Aug. 7, 1956 |
| 2,808,120 | Hunter | Oct. 1, 1957 |
| 2,869,664 | Utter | Jan. 20, 1959 |